J. H. MULLOY.
TIRE MOLD AND CLAMP.
APPLICATION FILED AUG. 16, 1919.
1,363,150.
Patented Dec. 21, 1920.
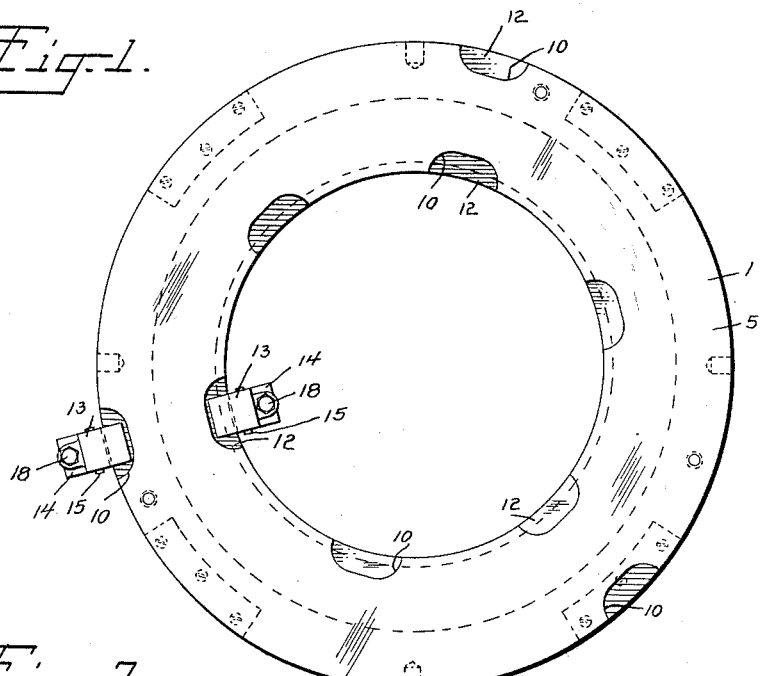
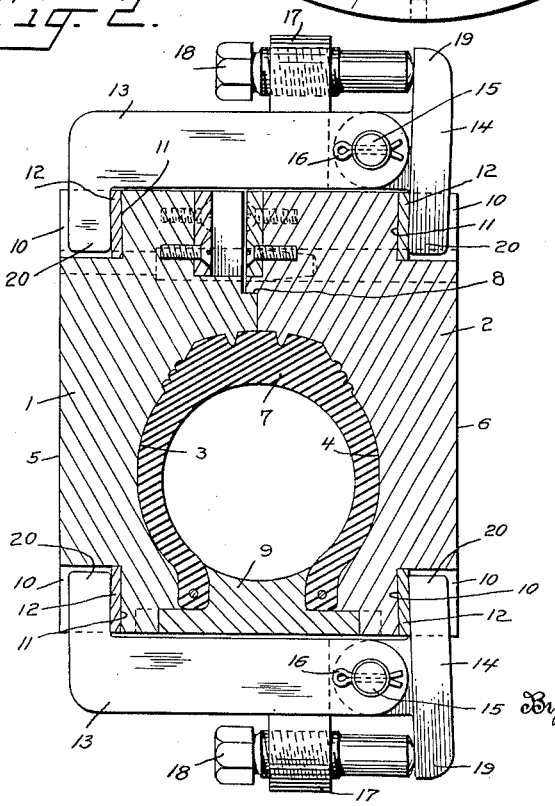
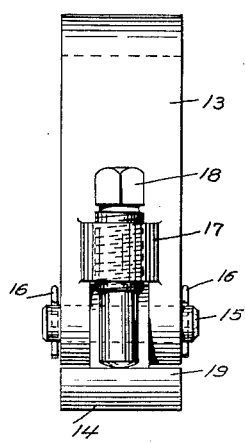
Inventor.
J. H. Mulloy,
By his Attorney.

UNITED STATES PATENT OFFICE.

JOHN H. MULLOY, OF DETROIT, MICHIGAN, ASSIGNOR TO MORGAN & WRIGHT, A CORPORATION OF MICHIGAN.

TIRE MOLD AND CLAMP.

1,363,150.  Specification of Letters Patent.  Patented Dec. 21, 1920.

Application filed August 16, 1919. Serial No. 317,842.

*To all whom it may concern:*

Be it known that I, JOHN H. MULLOY, a citizen of the United States, residing at Detroit, county of Wayne, and State of Michigan, have invented certain new and useful Improvements in Tire Molds and Clamps, of which the following is a full, clear, and exact description.

This invention relates to molds for vulcanizing plastic articles to a form predetermined by the complementary faces of its sections and especially to clamps for holding the sections together.

It aims to provide a new and improved type of adjustable clamp which is convenient to manipulate and which is proof against accidental displacement once it has been assembled upon the mold.

One form of the construction comprises a plurality of mold sections whose inner opposed faces are oppositely curved or hollowed out to impart the desired configuration to the article, and whose outer side faces are preferably flat for convenience in stacking a number of the molds upon one another. Notches are provided in the outer side faces of the mold sections adjacent their inner and outer peripheries to receive clamps each of which comprises pivotally connected members with finger like portions which may be gripped snugly upon the opposed sections of the mold by a simple screw expedient.

The invention is illustrated in the accompanying drawings in which—

Figures 1 and 2 are plan and sectional views of a sectional tire mold, the clamps appearing in full lines, and Fig. 3 is a view looking down on top of one of the clamps.

In the embodiment of the invention illustrated in the accompanying drawings, annular sections 1 and 2 which constitute the tire mold are provided with oppositely curved inner faces 3 and 4 and flat outer faces 5 and 6. Within the sections a tire casing 7 is adapted to be placed preliminary to its vulcanization. The tire receiving cavity may be closed at the top and bottom in any suitable fashion, as shown being closed at the top by a lap joint 8 and at the bottom by a bull ring 9. While the mold illustrated is of the internal fluid pressure type, the invention is to be understood as not limited in its application thereto as obviously any other suitable manner of exerting pressure internally of the article being vulcanized may be employed.

Notches 10 are provided in the outer faces of the opposed sections adjacent their inner and outer peripheries and these notches are arranged in pairs opposite each other. The opposed faces or walls 11 of opposed notches of each pair are preferably convergent inwardly, *i. e.* toward the tire cavity and for durability are preferably lined with wear plates 12.

Articulated clamps are provided to hold the sections together and each of these comprises an L-shaped member 13 and a T-shaped member 14 pivoted together as indicated at 15. As shown the pivot consists of a pin apertured transversely to receive cotter pins 16 restraining endwise displacement of the pin. A lug 17 integral with the L-shaped member is apertured and threaded in a direction transverse the pivot 15 to receive a screw or bolt 18 whose free forward end is adapted to be thrust against an abutment portion 19 of the T-shaped member and to thereby bring the gripping portions 20 of the two clamping members flat against the opposed convergent faces of the notches.

Obviously the number and disposition of the notches and clamps may be varied to suit the force tending to displace the sections 1 and 2 of the mold. And while the headed bolt 18 is a preferred means for gripping the members of the clamp upon the mold, a variety of other devices may be employed to perform the same function.

It will thus be seen that the invention contemplates an exceedingly simple form of clamp which does not prevent a number of molds being stacked upon one another and when tightened in place it is prevented from working loose in a radial or nearly radial direction by the inwardly convergent opposed faces of each pair of notches. By pivoting the two members of the clamp together, inaccuracies in workmanship may be compensated for and wear in service may be taken up.

Having thus described my invention, what I claim and desired to protect by Letters Patent is:

1. A vulcanizing mold having a plurality of sections shaped to impart a desired configuration to an article and provided with notches, in combination with a plurality of clamps each comprising articulated members insertible in said notches, and means for securing the members against accidental displacement from their normal working position.

2. A vulcanizing mold having a plurality of sections shaped to impart a desired configuration to an article and provided with notches, in combination with a plurality of clamps each comprising articulated members insertible in said notches, and adjustable means for securing the members against displacement from their normal working position.

3. A vulcanizing mold having a plurality of sections shaped to impart a desired configuration to an article and provided with notches, in combination with a plurality of clamps each comprising hinged members insertible in said notches, and means for securing the members against accidental displacement from their normal working position.

4. A vulcanizing mold having a plurality of sections shaped to impart a desired configuration to an article and provided with notches, in combination with a plurality of clamps each comprising hinged members insertible in said notches, and adjustable means for securing the members against displacement from their normal working position.

5. A vulcanizing mold having a plurality of sections in combination with a plurality of clamps each comprising pivoted members with mold gripping and abutment portions at opposite sides of their pivot, and a thrust member for forcing said abutment portions apart.

6. A vulcanizing mold having a plurality of sections, in combination with a plurality of clamps each comprising pivoted members with mold gripping portions and abutment portions at opposite sides of their pivot and a threaded thrust member carried by one of said abutment portions for shifting the other away.

7. A vulcanizing mold having complemental sections provided in their outer side faces with notches whose opposed inner faces are inwardly convergent, articulated clamping members having gripping portions introduceable into said notches, and means for securing the latter in said notches.

8. A vulcanizing mold having a plurality of sections provided in their external faces with notches, in combination with clamps insertible in said notches for holding said sections against lateral displacement and comprising L and T-shaped members pivoted together, a threaded lug on one of said members, a threaded element carried by said lug and adapted to be thrust against one end of said T-shaped member.

9. An adjustable clamp for tire molds comprising pivoted parts, and a one piece member movable transversely of their pivot to permit gripping the parts upon the mold.

10. A vulcanizing mold having a plurality of sections shaped to impart the desired configuration to an article and provided in its outer side faces with notches, in combination with a clamp shorter than the distance between the outer side faces and comprising pivotally connected members, and an element for shifting the members.

11. A vulcanizing mold having a plurality of sections shaped to impart the desired configuration to an article and provided in its outer side faces with notches, in combination with a clamp fitting in said notches and comprising pivotally connected members, and an element for shifting the members, said element being located wholly to one side of a periphery of the mold and between its outer side faces.

12. A clamp for molds having mold gripping portions and abutment portions, a hinge connecting said members and located between said mold gripping portions and the abutment portions, and a thrust member sustained by one of the abutment portions and adapted to coöperate with the other of said abutment portions to move the members relatively.

Signed at Detroit, county of Wayne, and State of Michigan, this 5th day of August, 1919.

JOHN H. MULLOY.